United States Patent Office 3,202,620
Patented Aug. 24, 1965

3,202,620
POLYURETHANE PLASTICS
Rudolf Merten, Cologne-Flittard, and Erwin Müller and Günther Braun, Leverkusen, Germany, assignors to Farbenfabriken Bayer Aktiengesellschaft, Leverkusen, Germany, a corporation of Germany
No Drawing. Filed Nov. 23, 1960, Ser. No. 71,175
Claims priority, application Germany, Nov. 27, 1959, F 29,945; Jan. 30, 1960, F 30,425
19 Claims. (Cl. 260—2.5)

This invention relates to polyurethane plastics and more particularly, to improved polyurethane plastics containing carbohydrates.

It is well known to prepare polyurethane plastics from polyhydroxy compounds such as polyesters, polyethers, polythioethers, polyacetals and the like which contain free hydroxyl groups with organic polyisocyanates and if necessary cross-linking agents such as polyhydric alcohols, polyamines, water and the like. It has also been proposed heretofore to use water-soluble carbohydrates in small amounts, for example, those polyols obtained from the condensation of alkylene oxides such as propylene oxide with the carbohydrates. Furthermore, it has also been proposed to use small amounts of carbohydrates in the production of polyesters which may in turn be used for the preparation of polyurethane plastics.

It has not been possible heretofore to use larger proportions of carbohydrates in spite of the obvious economical advantages. Several disadvantages have prevented the successful use of substantial amounts of these compounds in the production of polyurethane plastics. For one thing the carbohydrates are generally hydrophilic and are difficult to dissolve in organic solvents so that they can be mixed and reacted with organic polyisocyanates. Further, they generally have melting points above the usual mixing temperature, i.e. room temperature, for mixing the components of a polyurethane plastic. For the same reason they cannot be used as inert extenders because they crystallize out of the foam when it has cooled back to room temperature. No successful technique for modification of the carbohydrates to overcome these difficulties has been previously proposed. Other inherent difficulties are that the carbohydrates are readily subject to degradation reactions in the presence of either alkali or acid catalysts and they become discolored and isomerized on heating for a relatively long period.

It is, therefore, an object of this invention to provide polyurethane plastics which contain carbohydrates and which are free from the foregoing disadvantages. Another object of this invention is to provide an improved polyol based on carbohydrates for the production of polyurethane plastics. It is also an object of this invention to provide economical polyurethane plastics based on carbohydrates which may take the form of cellular plastics, substantially non-porous elastomeric plastics, film-like structures, adhesives and the like. Still another object of this invention is to provide polyurethane plastics which are based on relatively inexpensive raw materials without a substantial loss in the properties of the resulting polyurethane plastic below that of polyurethane plastics based on conventional polyols. A further object of this invention is to provide an improved method for making polyurethane plastics which contain relatively large amounts of carbohydrates.

The foregoing objects and others which will become apparent from the following description are accomplished in accordance with the invention, generally speaking, by providing polyurethane plastics obtained by a process which comprises reacting an organic polyisocyanate with a polyol prepared by a process which comprises condensing a carbohydrate containing at least 4 carbon atoms, an oxo compound and an alcohol or a phenol. Thus, this invention contemplates polyols for the preparation of polyurethane plastics which are prepared by condensing at least three components together, the three components comprising a carbohydrate which has at least 4 carbon atoms, i.e. $C_4$ and higher monosaccharides, oligosaccharides and polysaccharides; oxo compounds, i.e. aldehydes and ketones and hydroxy compounds, i.e. alcohols and phenols, preferably in the presence of an acid catalyst. The resulting condensate is a colorless to dark substance which is more or less viscous or even plastic depending on the particular composition. The solubility of the compounds is based on the components used in the preparation thereof. For example, the condensate of formaldehyde, diethylene glycol and sucrose has unlimited solubility in water and is not soluble in benzene. The reaction of these three components may be carried out simultaneously or in stages. For example, the carbohydrate can be initially condensed with the oxo compound and then with alcohol and/or phenol or the acetals of the alcohol or phenols with the carbohydrate prepared in a first stage may be subsequently condensed with the oxo compound.

The ratios between the three components are preferably chosen so that the final product has an hydroxyl content of at least about 1 percent by weight. Moreover, in accordance with a preferred embodiment of the invention, at least about 0.5 mol of the oxo compound is used for each monosaccharide unit present in the carbohydrate. "Monosaccharide unit" refers to the number of basic saccharide units in the molecule, i.e. a disaccharide has two monosaccharide units, a trisaccharide has three etc. The quantity of the alcohol or phenol component is preferably such that from about 0.2 to about 4—OH equivalents are present for each mol of the oxo compound, with the proviso that at least about 0.5 —OH equivalents are used for each monosaccharide unit present in the carbohydrate. The reaction of the three components normally takes place with the concurrent use of water as a solvent. The water may either be added during the condensation or can be supplied, for example, as a solvent for one of the components as is the case when formalin is the oxo component. The reaction mixtures is preferably heated until homogeneity is reached. Temperatures within the range of from about 50° C. to about 100° C. are preferred. It is also possible to carry out the reaction under pressure. After the condensation is essentially complete, the water is removed, for example, by distillation. The residual water of condensation is preferably reduced to about 0.5 percent by weight or lower, for example by reducing the pressure to about 12 mm. Hg/90° C. Furthermore, the product may be washed with organic solvents such as benzene, chloroform, dioxane and the like to concurrently remove the water. In the production of cellular polyurethane plastics as more particularly pointed out below it is often desirable to leave a predetermined amount of water in the condensate sufficient for reaction with an organic polyisocyanate to produce a cellular structure in the subsequent production of cellular polyurethane plastics.

Any suitable carbohydrate may be used for the production of the polyols of the invention which are suitable for further reaction with organic polyisocyanates to prepare polyurethane plastics, provided that the carbohydrate contains at least 4 carbon atoms. The term "carbohydrate" as used herein refers to compounds composed of carbon, hydrogen and oxygen corresponding to the formula $C_x(H_2O)_y$ wherein $x$ and $y$ are whole integers and thus the compounds are monsaccharides when $x$ and $y$ are 4 to 7, disaccharides when $x$ is 12 and $y$ is 11, trisaccharides when $x$ is 18 and $y$ is 16 and polysaccharides when $x$ and $y$ are integers greater than 18. In other words, the bioses and trioses are excluded because they do not contain at least 4 carbon atoms, but any other suitable carbohydrate may be used including such monosacchardies as tetroses for example erythrose, erythrulose and the like; pentoses for example arabinose, xylose, ribose, arabinulose and the like; hexoses for example glucose, galactose, mannose, fructose, sorbose and the like; heptoses for example mannoheptose and the like; disaccharides such as lactose, maltose, sucrose, melibiose, trehalose, cellubiose and the like; trisaccharides such as raffinose, melezitose and the like; tetrasaccharides such as lupeose, stachyose, cellotetraose and the like; polysaccharides including the dextrin, the starches, cellulose and the like. In some cases it is necessary to treat the polysaccharides with acid catalysts and perhaps under pressure in order to bring them into a soluble form. In addition to the pure carbohydrates, condensates obtained by the condensation of formaldehyde under alkaline conditions, and known as formose, may be used. It is possible for a formose which contains unreacted formaldehyde to be reacted directly with an alcohol or a phenol to prepare the polyols of the invention. Carbohydrates originally containing at least 4 carbon atoms which have been partially modified by reaction at their hydroxyl and/or carbonyl groups may also be used such as, for example, the partial acylation products, alkylation products, sugar anhydrides, sugar acids, acetalization or ketalization products of carbohydrates may also be used in the process of the invention. Of course, where acetalization or ketalization products are used they need only be modified with the alcohols or phenols to prepare the polyols of this invention. Any of the modified compounds may be used provided they contain at least one free hydroxyl group in the molecule.

Any suitable oxo compound may be used in the process of the present invention including the various aldehydes and ketones as well as substances which will generate these compounds such as, for example, formaldehyde, acetaldehyde, propionaldehyde, butyraldehyde, isobutyraldehyde, benzaldehyde, furfural, acetone, methylethyl ketone, cyclohexanone, glyoxal, chloral or chloralhydrate, but advantageously formaldehyde is used in the various forms in which it is supplied commercially, such as formalin or paraformaldehyde and the like.

Any suitable alcohol, i.e. those in which the —OH is bonded directly to an aliphatic carbon atom, may be used including monohydric and polyhydric alcohols, it being preferred to use those which are not extracted by boiling water. In other words, it is preferred to use those alcohols which are not removed from the reaction mixture under the same conditions which will cause removal of the water as by distillation etc. Moreover, it is preferred not to use alcohols which will form low boiling linear or cyclic acetals. Thus, it is preferred to use monohydric alcohols which boil at atmospheric pressure above about 100° C. including those alcohols from $C_4$ to $C_{18}$ such as, for example, butanol, pentanol, hexanol, heptanol, octanol, nonyl alcohol, decyl alcohol and the like up to and including octadecyl alcohol and the various positional isomers of each of these as well as mixtures thereof; stearyl alcohol, ethylene chlorohydrin, ethylene cyanohydrin, dichlorohydrin, oleyl alcohol, benzyl alcohol, cyclohexanol and the like. For the reason given above, the polyhydric alcohols should as far as possible not form any cyclic acetals. Consequently, it is preferred to use those alcohols in which the hydroxyl groups are separated from one another by at least 4 carbon, oxygen, sulfur and/or nitrogen atoms, it being possible for the alcohol in other respects to contain any desired substituents. Suitable polyhydride alcohols are for example butane-1,4-diol, butene-1,4-diol, butyne-1,4-diol, pentane-1,4-diol, pentane-1,5-diol, hexane-1,6-diol, 7,18-dihydroxyoctadecane, 4,4'-dihydroxydicyclohexyl methane, 4,4'-dihydroxydicyclohexyldimethylmethane, castor oil and also the adducts of alkylene oxides (such as ethylene oxide, propylene oxide, butylene oxide, styrene oxide, epichlorohydrin and the like), with the above alcohols as well as the polyalcohols which otherwise form cyclic acetals, with their sulfur analogues and also polyphenols. Specific examples are the adducts of these alkylene oxides with butylene glycol, propane-1,2-diol, propane-1,3-diol, butane-1,3-diol, butane-2,3-diol, glycerine, trimethylol propane, trimethylol ethane, hexane-1,2,6-triol, pentaerythritol, sorbitol, mannitol, sugar in the broader sense, hydroquinone, 4,4'-dihydroxydiphenyl methane, 4,4'-dihydroxydiphenyl dimethyl methane, thiodiglycol and the like.

The reaction can be catalyzed by adding acid substances, for which purpose quantities of from 0.005 weight percent to 5 weight per cent are usual. An amount of 0.01–1 weight percent is preferred depending on the acid strength. Suitable acids are, for example, free organic and inorganic acids, such as hydrochloric acid, $H_2SO_4$, $P_2O_5 \cdot xH_2O$, $B_2O_3$, $HClO_4$, $HBF_4$, HF, HBr, HI, $BF_3 \cdot 2H_2O$, $HNO_3$, $H_2SO_3$, formic acid, acetic acid, propionic acid, the haloacetic acids, oxalic acid, benzoic acid, benzene- and toluene-sulphonic acids, higher polystyrene-sulphonic acids, if necessary in the form of ion exchangers, and also substances which react acidly, or change in the presence of water into acids, that is to say, all Lewis acids such as $AlCl_3$, $BF_3$, $RCOCL$ wherein R is alkyl such as methyl, ethyl and the like, $PCl_3$, $PCl_5$, chlorosulphonic acid, $ZnCl_2$, $SnCl_4$, $TiCl_4$ and the like.

Any suitable phenol may be used such as, for example, phenol, o-, m-, and p-cresols, as well as their technical mixtures, xylenols, tert.-butyl phenols, p-nonylphenol, chlorophenols, resorcinol, naphthols, nitrophenols, polychlorophenols, resorcinol-monoethers, saligenin, triethylphenol and bis(hydroxyphenyl)-alkanes and the like.

In accordance with one preferred embodiment of the invention mixtures of alcohols and phenols are used in the preparation of the polyols. Thus, a small addition of for example phenol or p-tert.-butyl phenol (for example from about 0.1 to about 2.5 mol percent, based on the monohydric or polyhydric alcohols introduced), produces a clearly apparent thermal stabilizing effect with respect to the polyhydroxy compounds serving as initial material according to the invention. This fact is shown, inter alia in the subsequent foaming and by a uniform color of the foam materials produced. Higher proportions of phenolic hydroxyl groups lead to a water-repelling effect of the polyhydroxy compounds and thus also of the reaction products with polyisocyanates which are produced according to the invention. In this way, for example, the water storage capacity is improved and the possibility of attack by polar solvents is reduced. Furthermore, a better compatibility between the polyhydroxy compound and the generally water-repellent polyisocyanate component is observed and this produces better workability.

Generally speaking, the quantity of phenolic component employed can amount to from about 1 to about 100 mol per cent of the alcoholic component, but a lower limit is set at 0.1 mol of phenolic component for each monosaccharide unit in the carbohydrate.

In the production of the polyurethane plastics of the invention any suitable organic polyisocyanate may be used including, for example, aliphatic, aromatic, and heterocyclic organic polyisocyanates such as, for example, tetra- and hexamethylene diisocyanates, arylene diisocyanates and their alkylation products such as the phenylene diisocyanates, naphthylene diisocyanates, diphenyl methane diisocyanates, toluylene diisocyanates, di- and tri-isopropyl benzene diisocyanates and triphenyl methane triisocyanates, tri-(p-isocyanatophenyl) thiophosphates, tri-(p-isocyanatophenyl) phosphates, aralkyl diisocyanates such as 1-(isocyanatophenyl)-ethyl isocyanate or the xylylene diisocyanates, as well as the polyisocyanates of the above type substituted by the various substituents such as oxyalkyl, oxyaryl, for example —OCH₃, —OC₆H₆ and the like, NO₂ Cl etc; furfurylidene diisocyanate; in addition, the reaction products of the above isocyanates with deficient quantities of polyhydroxy compounds, such as trimethylol propane, hexanetriol, glycerine and butanediol. Polyisocyanates masked, for example, with phenols or bisulphites and also polymerized isocyanates with isocyanurate rings are also to be mentioned.

In accordance with the process of the invention it is posible to prepare many different types of polyurethane plastics including coatings, cellular polyurethanes and noncellular polyurethanes which may be either cast or molded into useful articles of manufacture. It is also possible to mix the polyols described above which are prepared from carbohydrates, oxo compounds and alcohols or phenols with heretofore known organic compounds containing at least two active hydrogen containing groups as determined by the Zerewitinoff method, such as, for example, hydroxyl polyesters, polyhydric polyalkylene ethers, polyhydric polythioethers and the like. It is preferred to use organic compounds containing at least two active hydrogen containing groups as determined by the Zerewitinoff method which are reactive with an isocyanate group and include —OH, —NH₂, —NH, —COOH, —SH and the like. The molecular weight of these compounds containing active hydrogen containing groups may vary over a wide range but is preferably within the range of from about 500 to about 10,000. Furthermore, these compounds preferably have hydroxyl numbers between about 50 and about 350 and acid numbers, where applicable, preferably below about 5.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemilellitic acid, trimellitic acid, trimesic acid, mellophanic acid, prehnitric acid, pyromellitic acid, benzenepentacarboxylic acid, 1,4-cyclohexane-dicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbital and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalklene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers, Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,826,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

The polyols of this invention, i.e. those obtained from the carbohydrate, the oxo compound and an alcohol or phenol, can be reacted with excess organic polyisocyanate above that required to react with the hydroxyl groups to obtain a prepolymer containing terminal isocyanate groups which is then reacted with a cross-linking agent or the polyol. The organic polyisocyanate and the cross-linking agent may be combined in a single step to prepare a polyurethane plastic. Various additional reagents, catalysts, stabilizers and other additives may be added for the production of a particular type of compound or for the production of a compound having a particular utility but the essential feature of the invention is the production of polyurethane plastics from these materials.

The cellular polyurethane plastics may be prepared using carbon dioxide generated by water reacted with excess organic polyisocyanate as a blowing agent or a halohydrocarbon such as dichlorodifluoromethane, trichlorofluoromethane and the like, azo compounds such as, for example diazoaminobenzene, low boiling point alkanes such as pentene, may be used. Either the prepolymer referred to above may be reacted with water to produce a cellular polyurethane plastic or in the alternative the organic polyisocyanate may be reacted with the polyol of this invention and water or in the presence of the halohydrocarbon to prepare a cellular polyurethane plastic in a one-step procedure. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylen ethers are included in the reaction mixture to prepare a cellular polyurethane plastic, it is preferred to employ a silicone oil of the above patent within the scope of the formula

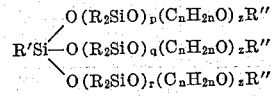

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

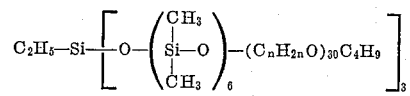

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example, molybdenum glycolate, tin compounds such as, stannous chloride, dialkyl tin salts of carboxylic acids, such as dibutyl tin di-2-ethyl hexoate, tin alcoholates such as stannous octoate, as well as other organometallic compounds such as are disclosed in U.S. Patent 2,846,408.

Another embodiment of this invention involves the production of substantially nonporous polyurethane plastics by reacting an organic polyisocyanate with at least a stoichiometric amount of the polyol of this invention and then reacting the resulting product which contains terminal hydroxyl groups with an organic peroxide, sulphur, formaldehyde or the like to produce a highly cross-linked substantially nonporous polyurethane plastic. By still another procedure, substantially nonporous polyurethane plastics are produced from the above described prepolymer containing treminal —NCO groups by reaction thereof with water, polyhydric alcohols, polyamines, amino alcohols and the like. This makes it possible to produce a two-component system for the production of substantially nonporous polyurethane plastics including castings, coatings, moldings and the like. Castings are prepared by mixing either a monomeric organic polyisocyanate or the above-described isocyanate terminated prepolymer with a cross-linking agent, pouring the resulting mixture in a mold and allowing it to cure to form a substantially nonporous elastomer. Substantially anhydrous conditions are maintained throughout the casting procedure. It is also possible to produce a coating composition by dissolving the organic polyisocyanate, polyol adduct containing either terminal —NCO groups or —NCO groups which have been blocked with a low molecular weight alcohol or phenol in an organic solvent such as, for example, xylene, ethyl acetate, toluene, ethylene glycol, monoethyl ether acetate and the like. The coating composition can be applied in any suitable way such as by dipping, brushing, roller coating, spraying and the like. Any suitable substrate may be coated such as, for example, wood, metal, paper and the like.

The products obtained by the invention show advantageous mechanical properties, with many possibilities of varying the starting components, these determining the nature and properties of the final products, according to the procedure employed. For example, lacquers and coatings with a low degree of brittleness and good bonding power, and also hard foam materials with good internal strength and elasticity, are obtained.

The products of the invention are useful for many applications including the production of both sound and thermal insulation, gaskets, the potting of electrical components, bushings and the coating of various substrates as more particularly pointed out above.

The invention is further illustrated by the following examples in which the parts are by weight unless otherwise indicated.

The following table shows the preparation of some polyhydroxy compounds of the present invention in which the reaction components are weighed together, and unless otherwise mentioned, formaldehyde is used in the form of approximately a 37 percent formalin solution. The quantity of water present in the formalin is normally sufficient; otherwise more water can be added. After adding an acid catalyst, the mixture is heated for about 2 to 5 hours at about 80–100° C. and then water is removed at the same temperature by slowly applying a vacuum. After about 5 to 8 hours at about 90° C./12 mm. Hg, the water content of the product is about 0.5 percent and lower. Colorless to dark brown viscous substances are obtained in a substantially quantitative yield, depending on the quantity and nature of the catalyst.

| Example | Carbohydrate | Oxo compound | Alcohol | Catalyst | $H_2O$ added, ml. | Yield, parts | Viscosity, cp./25° C. | Percent OH | Percent $H_2O$ | Color |
|---|---|---|---|---|---|---|---|---|---|---|
| 1 | 600 parts saccharose. | 1140 parts formalin. | 1460 parts diethylene glycol. | 0.5% p-toluene sulphonate. | 500 | 2,026 | 1,320 | 14.5 | | Dark. |
| 2 | do | do | do | 1% $H_3PO_4$ | 500 | 2,208 | 1,340 | 19.1 | | Yellow. |
| 3 | do | do | do | 1% $BF_3$ etherate. | 500 | 2,042 | 1,350 | 9.7 | | Dark. |
| 4 | do | do | do | 1% $HBF_4$ | | 1,866 | 5,900 | 6.9 | | Do. |
| 5 | do | do | do | 0.5% polystyrene sulphonate. | | 2,238 | 2,150 | 10.5 | | Do. |
| 6 | do | do | do | 0.1% $HBF_4$ | | 2,184 | 8,800 | 11.5 | | Light yellow. |
| 7 | do | do | do | 0.02% $HClO_4$ (70%). | | 2,172 | 6,000 | 10.8 | 0.53 | Do. |
| 8 | do | do | do | 0.01% p-toluene sulphonate. | | 2,262 | 2,210 | 15.6 | 0.75 | Colorless. |
| 9 | do | do | do | 0.05% S 3333 | | 2,263 | 5,850 | 12.8 | 0.69 | Light yellow. |
| 10 | do | do | do | 0.05% $HBF_4$ | | 2,116 | 4,225 | 13.6 | 0.62 | Do. |
| 11 | do | do | do | 0.005% $HClO_4$ | | 2,198 | 6,880 | 12.2 | 0.4 | Do. |
| 12 | 1 mol saccharose. | 2 mol $CH_2O$ | 2 mol diethylene glycol. | 0.2% $H_3PO_4$ | 350 | 572 | 250,000 | 22.1 | | Colorless. |
| 13 | do | 12 mol $CH_2O$ | 8 mol diethylene glycol. | 0.5% p-toluene sulphonate. | 250 | 1,150 | 2,000 | 11.4 | | Dark. |
| 14 | do | do | do | 0.02% $HClO_4$ (70%). | | 1,230 | 8,400 | 6.3 | | Do. |
| 15 | do | 8 mol $CH_2O$ | 4 mol diethylene glycol. | 1% $H_3PO_4$ | | 892 | 20,280 | 15.8 | 0.88 | Yellowish. |
| 16 | do | 4 mol $CH_2O$ | do | 0.05% $HBF_4$ | | 814 | 25,800 | 21.1 | 0.17 | Colorless. |
| 17 | do | do | do | 0.1% $HBF_4$ | | 807 | 94,800 | 17.8 | 0.28 | Yellowish. |
| 18 | do | 3 mol $CH_2O$ | 3 mol diethylene glycol. | 0.025% $HClO_4$ | | 643 | 200,000 | 15.0 | | Dark. |
| 19 | do | do | do | 0.05% $HBF_4$ | | 710 | 25,300 | 25.2 | 0.8 | Yellowish. |
| 20 | do | 2.75 mol $CH_2O$ | do | 0.08% $HBF_4$ | | 700 | 186,000 | 20.9 | 0.28 | Do. |
| 21 | do | 4 mol $CH_2O$, 2 mol acetone. | 4 mol diethylene glycol. | 0.1% $HBF_4$ | | 793 | 72,400 | 17.6 | 0.29 | Do. |

| Example | Carbohydrate | Oxo compound | Alcohol | Catalyst | H₂O added, ml. | Yield, parts | Viscosity, cp./25° C. | Percent OH | Percent H₂O | Color |
|---|---|---|---|---|---|---|---|---|---|---|
| 22 | do | 2 mol CH₂O, 2 mol acetone. | 2 mol diethylene glycol. | 0.1% HBF₄ | -------- | 580 | 500,000 | 23.4 | -------- | Do. |
| 23 | do | 2 mol CH₂O, 2 mol butyraldehyde. | do | 0.1% HBF₄ | -------- | 618 | 200,000 | 19.0 | 0.39 | Do. |
| 24 | do | 2 mol CH₂O, 2 mol cyclohexanone. | do | 0.15% HBF₄ | -------- | 640 | 200,000 | 20.0 | 0.51 | Do. |
| 25 | do | 3 mol cyclohexanone. | 3 mol diethylene glycol. | 0.3% HBF₄ | 300 | 657 | 28,500 | 27.9 | 0.47 | Do. |
| 26 | do | 4 mol CH₂O | 2 mol diethylene glycol, 2 mol 3-methoxy-butan-1-ol. | 0.15% HBF₄ | -------- | 741 | 32,300 | 15.9 | 1.1 | Do. |
| 27 | do | do | 2 mol diethylene glycol, 2 mol diethylene glycol monoethylether. | 0.12% HBF₄ | -------- | 796 | 13,000 | 14.2 | 0.28 | Do. |
| 28 | do | 6 mol CH₂O | 3 mol diethylene glycol, 3 mol octanol. | 0.09% HBF₄ | -------- | -------- | -------- | -------- | -------- | Slightly cloudy. |
| 29 | do | do | 6 mol thiodiglycol. | 0.2% HBF₄ | -------- | 1,169 | 3,300 | 18.0 | 0.42 | Yellowish. |
| 30 | do | 3 mol CH₂O | 3 mol techn. triethylene glycol (mol. weight=154). | 0.08% HBF₄ | -------- | 1,692 | 35,200 | 18.0 | 0.15 | Do. |
| 31 | do | do | 1 mol diethylene glycol, 2 mol 3-methoxy-butan-1-ol. | 0.07% HBF₄ | -------- | 1,155 | 100,000 | 20.0 | 0.45 | Do. |
| 32 | 1 mol lactose | 5 mol paraformaldehyde. | 5 mol diethylene glycol. | 0.08% HBF₄ | 400 | 877 | 18,730 | 14.5 | 0.24 | |
| 33 | 2 mol xylose | 3 mol CH₂O | 3 mol techn. triethylene glycol (mol. weight=154). | 0.1% HBF₄ | -------- | 789 | 11,750 | 15.3 | 0.45 | |
| 34 | 1 mol saccharose. | 5 mol CH₂O | 5 mol hexan-1,6-diol. | 0.1% HBF₄ | -------- | 1,013 | 17,930 | 17.6 | 0.16 | Light yellow. |
| 35 | do | 4 mol CH₂O | 4 mol ethylene-chlorohydrin. | 0.2% HBF₄ | -------- | 556 | 15,700 | 8.4 | -------- | Brown. |
| 36 | do | do | 4 mol diethylene glycol monomethyl ether. | 0.12% HBF₄ | -------- | -------- | 2,825 | 12.5 | 0.18 | Yellow. |
| 37 | do | 3 mol CH₂O | 3 mol but-2-ene-1,4-diol. | 0.15% HBF₄ | -------- | -------- | 300,000 | 22.7 | 0.64 | Do. |
| 38 | do | 4 mol CH₂O | 2 mol diethylene glycol, 2 mol ethylene glycol monoxylenyl ether. | 0.1% HBF₄ | -------- | -------- | 26,430 | 17.0 | 0.28 | Do. |

*Example 39*

About 342 parts of cane sugar (about 1 mol), about 650 parts of approximately a 37 percent formalin solution (about 8 mol CH₂O) and about 0.2 part of about 70 percent perchloric acid are kept for about 4 hours at about 90° C. and then concentrated in water jet vacuum. A very viscous and tenacious yellow-colored mass remains, which does not show any tendency to crystallization. About 424 parts of diethylene glycol (about 4 mols) are then added to this residue and stirred for approximately another 10 hours at about 90° C./12 mm. Hg, using an oil bath. There remain about 788 parts of a darkish colored viscous resin with about 9.0 percent —OH, about 0.44 percent H₂O and a viscosity of about 87,000 cp./25° C.

*Example 40*

About 324 parts of dextrin are boiled for about 4 hours with about 1 part of HBF₄ in about 1 liter of water. About 486 parts of approximately a 37 percent formalin (about 6 mol CH₂O) and about 636 parts of diethylene glycol (about 6 mol) are then added, stirred for approximately another 4 hours at about 90° C. and the water is then removed at about 90° C./12 mm. Hg. There are obtained about 958 parts of a light yellow condensate. Viscosity about 200,000 cp./25° C., about 19.6 percent —OH, about 0.59 percent H₂O.

*Example 41*

About 38 parts of concentrated H₂SO₄ are slowly added while stirring to about 324 parts of potato flour in about 500 parts of water and the mixture is boiled for about 10 hours under reflux. It is then neutralized with dilute NaOH and adjusted to a pH value of about 6 with dilute hydrochloric acid. After adding about 245 parts of approximately a 37 percent formalin solution (about 3 mols CH₂O) and about 318 parts of diethylene glycol, the temperature is kept for about 4 hours at about 90° C. and then the mixture is concentrated in a water jet vacuum at this temperature. About 628 parts of a brown reaction product are obtained. Viscosity about 56,330 cp./25° C., about 27.2 percent —OH, about 0.61 percent H₂O.

Using a water-soluble starch, about 700 parts of a likewise dark brown condensate are obtained. Viscosity about 19,400 cp./25° C., about 33.2 percent —OH, about 0.18 percent H₂O.

*Example 42*

A mixture of about 50 ml. of concentrated sulphuric acid and about 18 ml. of H₂O are added within about 35 minutes to about 180 parts of anhydrous glucose and about 173 parts of isobutyraldehyde. The mixture is stirred for approximately another 2 hours and the viscous mass is treated with water, taken up in chloroform and washed until free from acid. After drying and distilling off the solvent, there are obtained about 181 parts of an isobutyrylidene glucose, which are stirred with about 81 parts of approximately 37 percent formalin (about 1 mol CH₂O) and about 106 parts of diethylene glycol with addition of about 1 part of HBF₄ at about 90° C. for about 10 hours. All volatile constituents are then distilled off at about 90° C. in vacuo and about 281 parts of a yellow product are obtained. Viscosity about 8720 cp./25° C., about 8.5 percent —OH, about 0.21 percent H₂O.

*Example 43*

About 198 parts of a glucose with about 9 percent H₂O content and about 236 parts of cyclohexanone are converted into the bis-cyclohexylidene glucose by using about 50 ml. of concentrated sulphuric acid in a manner analogous to Example 42.

About 340 parts of the bis-cyclohexylidene glucose thus obtained, about 162 parts of approximately a 37 percent formalin solution (about 2 mols. $CH_2O$), about 212 parts of diethylene glycol and about 0.5 part of $HBF_4$ are kept for about 10 hours at about 90° C. with addition of about 200 ml. of water and then all volatile constituents are removed in vacuo at about 100° C./12 mm. Hg. About 248 parts of a yellowish condensate are obtained. Viscosity about 6960 cp./25° C., about 12.1 percent —OH, about 0.14 percent $H_2O$.

Example 44

About 342 parts of sucrose, about 240 parts of glacial acetic acid and about 1 part of $HBF_4$ are heated for about 10 hours at about 100° C. The mixture is concentrated as far as possible and about 162 parts of approximately a 37 percent formalin solution (about 2 mol) and about 212 parts of diethylene glycol are added. After about 4 hours at about 90° C., the water is removed at the same temperature in water jet vacuum at about 12 mm. Hg. About 626 parts of a dark product are obtained. Viscosity about 400,000 cp./25° C., about 15.2 percent —OH, about 0.47 percent $H_2O$.

Example 45

About 100 parts of the polyhydroxy compound of Example 1 are mixed with about 1 part of dimethyl benzylamine and about 5 parts of approximately a 50 percent aqueous solution of sodium castor oil sulphate. Foaming is effected by adding about 109 parts of 65 percent 2,4- and 35 percent 2,6-toluylene diisocyanate and a viscous and fine-pored hard foam material is obtained with the following physical properties:

Density _____kg./m.³__ 24
Compression strength _____kg./cm.²__ 0.8
Impact toughness _____kg./cm__ 0.4

Example 64

About 50 parts of the polyhydroxy compound of Example 1 are mixed with about 50 parts of a polyester (—OH number about 360) prepared from adipic acid, phthalic anhydride, oleic acid and trimethylol propane. About 1 part of permethylated aminoethyl piperazine and about 5 parts of approximately a 50 percent aqueous solution of sodium castor oil sulphate are added to this mixture. Foaming is effected while stirring in about 162 parts of 4,4'-diphenyl-methane diisocyanate to provide a nonshrinking foam material with the following physical properties:

Density _____kg/m.³__ 41
Compression strength _____kg/cm.²__ 2.7
Impact toughness _____kg/cm__ 0.5

Example 47

A mixture of about 50 parts of the polyhydroxy compound of Example 6 and about 50 parts of polypropylene glycol (—OH number about 360) is stirred with about 1 part of dimethyl benzylamine, about 0.3 part of oxalkylated polysiloxane having the formula

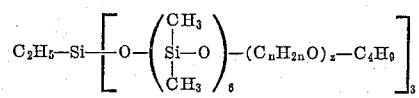

wherein $(C_nH_{2n}O)$ represents about 17 oxyethylene units and about 13 oxypropylene units and z is equal to about 30 and about 5 parts of approximately a 50 percent aqueous solution of sodium castor oil sulphate. This mixture is foamed with about 117 parts of initially polymerized toluylene diisocyanate (about 42 percent —NCO).

A fine-pored hard foam material is obtained which has the following physical properties:

Density _____kg/m.³__ 25
Compression strength _____kg/cm.²__ 0.6
Impact toughness _____kg/cm__ 0.2

Example 48

About 80 parts of the polyhydroxy compound of Example 5 are mixed with about 20 parts of a polyester (—OH number about 290) prepared from adipic acid, phthalic anhydride and 1,2,6-hexanetriol. This mixture is saponified with about 2 parts of permethylated aminoethyl piperazine, about 0.3 part of the oxalkylated polysiloxane employed in Example 47 and about 5 parts of approximately a 50 percent aqueous solution of sodium castor oil sulphate.

The mixture is foamed by using about 139 parts of 4,4'-diphenylmethane diisocyanate.

The non-shrinking hard foam is characterized by the following physical properties:

Density _____kg/m.³__ 37
Compression strength _____kg/cm.²__ 1.9
Impact toughness _____kg/cm__ 0.3

Example 49

About 50 parts of the polyhydroxy compound of Example 20 are heated to about 70–80° C. About 54 parts of 65 percent 2,4- and 35 percent 2,6-toluylene diisocyanate are then added. The mixture is stirred for about 10 minutes, whereby it becomes appreciably more viscous, and then it is emptied into closed boxes. The specimens are heated for about 1 hour at about 100° C. and a solid insoluble plastic is obtained, which shows a number of bubbles because of the water content in the condensate.

By previous brief dehydration with benzene in the heterogeneous phase, the water content and thus the bubble formation can be reduced.

Corresponding plastics are obtained by the same method of procedure from the following components:

(a) About 100 parts of the polyhydroxy compound of Example 29 and about 111 parts of 1,5-naphthylene diisocyanate.

(b) About 100 parts of the polyhydroxy compound of Example 31 and about 99 parts of 1,6-hexamethylene diisocyanate.

(c) About 100 parts of the polyhydroxy compound of Example 33 and about 78 parts of 65 percent 2,4- and 35 percent 2,6-toluylene diisocyanate.

(d) About 100 parts of the polyhydroxy compound of Example 34 and about 150 parts of p-isocyanatophenyl phosphoric acid triester.

Example 50

About 25 parts of the polyhydroxy compound of Example 20 are mixed with about 93 parts of a reaction product of toluylene diisocyanate and trimethylol propane in approximately a 75 percent acetic ester solution (about 13.9 percent —NCO). About 1 part of a condensation product of about 1 mol of N-methyl diethanolamine and about 2 mols of phenyl isocyanate is added as catalyst. The solution is brushed onto glass plates and dried at room temperature to form a tough elastic lacquer, which is not attacked by water and the conventional solvent such as glycol monomethyl ether acetate, and is only slowly attacked by dimethylformamide. The lacquer coating still shows a slight tendency to bubble formation because of its water content. By previous dehydration as in Example 49, bubble-free lacquer coatings are obtained.

Lacquers with analogous properties are obtained by combinations of the following components:

(a) About 100 parts of the polyhydroxy compound of Example 21 and about 315 parts of polyisocyanate according to Example 50; about 4.1 parts of catalyst according to Example 50.

(b) About 100 parts of the polyhydroxy compound of Example 22 and about 418 parts of polyisocyanate according to Example 50; about 5.0 parts of catalyst according to Example 50.

(c) About 100 parts of the polyhydroxy compound of Example 23 and about 340 parts of polyisocyanate according to Example 50; about 4.5 parts of catalyst according to Example 50.

(d) About 100 parts of the polyhydroxy compound of Example 24 and about 360 parts of polyisocyanate according to Example 50; about 4.6 parts of catalyst according to Example 50.

(e) About 100 parts of the polyhydroxy compound of Example 12 and about 660 parts of approximately a 45 percent solution of the polyisocyanate according to Example 50 with about 8.3 percent —NCO; about 5.0 parts of catalyst according to Example 50.

The mixtures can also be brushed onto fabric and dried at about 100° C. to form permanent and solvent-resistant impregnations.

*Example 51*

About 40 parts of polyhydroxy compound of Example 27, about 39 parts of 80 percent 2,4- and 20 percent 2,6-toluylene diisocyanate, about 2 parts of approximately a 50 percent aqueous solution of sodium ricinoleic acid sulphate, about 0.7 part of 1-ethoxy-3-dimethyl aminopropane and about 7 parts of trichlorofluoromethane are stirred together and allowed to foam to give a quick-setting shrinkproof hard cellular polyurethane material with good strength and elasticity values.

*Example 52*

About 343 parts of cane sugar, about 600 parts of approximately a 37 perecent formalin solution (about 7.4 mols $CH_2O$), about 636 parts of diethylene glycol, about 60 parts of 4-tertiary butyl phenol and about 0.24 part of approximately a 70 percent aqueous perchloric acid are heated for about 4 hours at about 90° C. The vessel is exhausted to a vacuum of about 12–15 mm. Hg. at approximately the same temperature. As a residue, about 1100 parts of a brown viscous resin are obtained: Acid number about 5.9, about 10.3 percent —OH, about 0.44 percent $H_2O$, viscosity about 7700 cp./25° C.

*Example 53*

In a manner analogous to Example 52, about 343 parts of cane sugar, about 357 parts of approximately a 37 percent formalin solution, about 212 parts of diethylene glycol, about 180 parts of diethylene glycol monomethyl ether, about 60 parts of tertiary butyl phenol and about 0.85 part of $HBF_4$ are condensed to provide about 820 parts of a slightly yellowish resin: About 15.0 percent —OH, about 0.67 percent $H_2O$, viscosity about 13,600 cp./25° C.

*Example 54*

In a manner analogous to Example 52, about 343 parts of cane sugar, about 682 parts of approximately a 37 percent formalin solution, about 636 parts of diethylene glycol, about 38 parts of phenol and about 1.3 parts of $HBF_4$ are condensed to form about 1100 parts of a yellowish condensate: About 12.0 percent —OH, about 0.52 percent $H_2O$, viscosity about 23,700 cp./25° C.

*Example 55*

About 343 parts of cane sugar, about 245 parts of approximately a 37 percent formalin solution, about 188 parts of phenol and about 0.6 part of $HBF_4$ are heated for about 4 hours at about 90° C. Water is then slowly distilled off in vacuo until finally the pressure is about 50 mm. Hg, the temperature in the vessel being raised up to about 140–150° C. as the condensation and viscosity increases. There are obtained about 560 parts of a yellowish resin, which solidifies on cooling to form a brittle mass containing about 24 percent —OH.

In similar manner, the following combinations can be condensed:

(a) About 360 parts of starch, about 245 parts of approximately a 37 percent formalin solution, about 188 parts of phenol and about 5.0 parts of $HBF_4$, yield about 545 parts of resin with about 22.8 percent —OH (b) About 686 parts of cane sugar, about 244 parts of approximately a 37 percent formalin solution, about 94 parts of sugar, about 0.8 part of $HBF_4$ yield about 808 parts of resin with about 28.0 percent —OH and about 1.7 percent $H_2O$ (c) About 686 parts of cane sugar, about 1460 parts of approximately a 37 percent formalin solution, about 376 parts of phenol, about 1.3 parts of $HBF_4$ yield about 1210 parts of resin with about 19.0 percent —OH, about 0.19 percent $H_2O$ and an acid number of about 28.4.

*Example 56*

About 343 parts of cane sugar are heated with about 245 parts of approximately a 37 percent formalin solution and about 0.6 part of $HBF_4$ for about 4 hours at about 90° C. The mixture is concentrated in an oil bath at about 90° C. to about 90 mm. Hg. About 216 parts of technical cresol are slowly added dropwise and condensation is carried out to about 150° C./20 mm. Hg until the cresol is distilled off. About 622 parts of a brittle resin are obtained, with about 22.1 percent —OH and about 0.38 percent $H_2O$.

*Example 57*

In a manner analogous to Example 56, about 343 parts of cane sugar, about 165 parts of approximately a 37 percent formalin solution, about 1.2 parts of $HBF_4$ and about 190 parts of tertiary butyl phenol are condensed. There are obtained about 983 parts of a resin with about 17.5 percent —OH and an acid number of about 19.

*Example 58*

About 100 parts of the polyhydroxy compound of Example 52 are thoroughly mixed with about 2 parts of 3-dimethyl-amino-1-ethoxypropane and about 6 parts of approximately a 46 percent aqueous solution of sodium castor oil sulphate and then foamed with addition of about 148 parts of diphenylmethane-4,4'-diisocyanate. A fine-pored non-shrinking hard foam material is obtained, this material having the following physical properties:

| | |
|---|---|
| Density _____kg./m.³__ | 26 |
| Impact toughness _____kg./cm.__ | 0.5 |
| Bending strength under heat _____degrees__ | 121 |
| Compression strength _____kg./cm.²__ | 1.3 |
| Water absorption _____percent__ | 1.5 |

*Example 59*

About 100 parts of the polyhydroxy compound of Example 53 are stirred with about 2.5 parts of permethylated aminoethyl piperazine, about 0.2 part of dibutyl-tin-dilaurate and about 4 parts of approximately a 46 percent aqueous solution of sodium castor oil sulphate and thereafter foamed with about 158 parts of diphenylmethane-4,4'-diisocyanate. A hard foam material is obtained with the following physical properties:

| | |
|---|---|
| Density _____kg./m.³__ | 25 |
| Impact toughness _____kg./cm.__ | 0.2 |
| Bending strength under heat _____degrees__ | 125 |
| Compression strength _____kg./cm.²__ | 1.1 |
| Water absorption _____percent__ | 1.4 |

*Example 60*

About 50 parts of the polyhydroxy compound of Example 53 and about 50 parts of a branched polypropylene glycol (—OH number about 380) are stirred with about 1 part of permethylated aminoethyl piperazine, about 0.3 part of dibutyl-tin-dilaurate and about 5 parts of an aqueous solution of sodium castor oil sulphate (about 54 percent water). The foaming is effected with about 168 parts of diphenylmethane-4,4'-diisocyanate. A fine-pored hard foam material is obtained having the following properties:

| | |
|---|---|
| Density _____ kg./m.³__ | 34 |
| Impact toughness _____ kg./cm__ | 0.4 |
| Bending strength under heat _____ degrees__ | 127 |
| Compression strength _____ kg./cm.²__ | 1.3 |
| Water absorption _____ percent__ | 1.6 |

*Example 61*

About 100 parts of the polyhydroxy compound of Example 54 are foamed with about 2 parts of 3-dimethyl-amino-1-ethoxypropane and about 4 parts of approximately a 46 percent aqueous solution of sodium castor oil sulphate as well as about 142 parts of diphenylmethane-4,4-diisocyanate to form a non-shrinking hard foam material with the following physical properties:

| | |
|---|---|
| Density _____ kg./m.³__ | 58 |
| Impact toughness _____ kg./cm__ | 0.3 |
| Bending strength under heat _____ degrees__ | 161 |
| Compression strength _____ kg./cm.²__ | 2.6 |
| Water absorption _____ percent__ | 0.6 |

*Example 62*

For the production of rigid, insoluble and infusible molded elements, the following combinations are triturated with one another and heated under a press for about 1 hour at about 160° C.:

(a) About 15 parts of the polyhydroxy compound of Example 55 and about 28 parts of diphenyldimethyl-methane-4,4'-diisocyanate (b) About 15 parts of the polyhydroxy compound of Example 55(a) and about 14 parts of diphenyldimethyl-methane-4,4'-diisocyanate (c) About 18 parts of the polyhydroxy compound of Example 55(c) and about 17.4 parts of toluylene-2,4-diisocyanate (d) About 20 parts of the polyhydroxy compound of Example 57 and about 16 parts of p-phenylene diisocyanate.

The foregoing examples are for the purpose of illustration and it is to be understood that any other suitable organic polyisocyanate, polyol, catalyst or other additive and the like could have been used therein in accordance with the preceding disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. Polyurethane plastics obtained by a process which comprises reacting an organic polyisocyanate with a polyol prepared by a process which comprises condensing a carbohydrate having at least 4 carbon atoms, an oxo compound selected from the group consisting of aldehydes and ketones and a member selected from the group consisting of alcohols and phenols.

2. Polyurethane plastics obtained by the process of claim 1 wherein said polyol is prepared by condensing a polyhydric alcohol with a carbohydrate having at least 4 carbon atoms and an aldehyde.

3. Polyurethane plastics of claim 1 wherein said carbohydrate is an oligosaccharide.

4. The polyurethane plastic of claim 1 wherein said polyol is prepared by condensing said carbohydrate, said oxo compound selected from the group consisting of aldehydes and ketones and said member selected from the group consisting of alcohols and phenols in the presence of an acid catalyst.

5. The polyurethane plastic of claim 4 wherein less than about 0.005 percent by weight of said acid catalyst is used in the reaction mixture.

6. The polyurethane plastic of claim 1 wherein said polyol has a hydroxyl content of at least about 1 percent by weight.

7. The polyurethane plastics of claim 1 wherein at least about 0.5 mol of oxo compound is used per monosaccharide unit present in said carbohydrate.

8. The polyurethane plastics of claim 1 wherein said oxo compound is an aldehyde.

9. The polyurethane plastics of claim 1 wherein said oxo compound is formaldehyde.

10. A coating composition which comprises an inert organic solvent solution of the reaction product of an organic polyisocyanate with a polyol prepared by a process which comprises condensing under acid conditions a carbohydrate containing at least 4 carbon atoms with an oxo compound selected from the group consisting of aldehydes and ketones and a member selected from the group consisting of alcohols and phenols.

11. A substantially nonporous polyurethane which comprises the reaction product of an organic polyisocyanate with a polyol prepared by a process which comprises condensing under acid conditions a carbohydrate containing at least 4 carbon atoms with an oxo compound selected from the group consisting of aldehydes and ketones and a member selected from the group consisting of alcohols and phenols.

12. Polyurethane plastics obtained by a process which comprises reacting an organic polyisocyanate with a polyol prepared by a process which comprises condensing a carbohydrate having at least 4 carbon atoms, an oxo compound selected from the group consisting of aldehydes and ketones and an alcohol containing from 4 to 18 carbon atoms.

13. The polyurethane plastics of claim 12 wherein said alcohol is a polyhydric alcohol.

14. The polyurethane plastics of claim 12 wherein said alcohol is diethylene glycol.

15. The polyurethane plastics of claim 12 wherein said alcohol is thiodiglycol.

16. The polyurethane plastics of claim 1 wherein said polyol is prepared in a water solvent.

17. Polyurethane plastics obtained by a process which comprises reacting an organic polyisocyanate with a polyol prepared by a process which comprises condensing a carbohydrate having at least 4 carbon atoms with an oxo compound selected from the group consisting of aldehydes and ketones in a first stage and then condensing the initial product with a member selected from the group consisting of alcohols and phenols.

18. A cellular polyurethane plastic prepared by a process which comprises reacting in the presence of a blowing agent an organic polyisocyanate with a polyol prepared by a process which comprises condensing a carbohydrate having at least 4 carbon atoms, an oxo compound selected from the group consisting of aldehydes and ketones and a member selected from the group consisting of alcohols and phenols.

19. A cellular polyurethane plastic prepared by a process which comprises reacting in the presence of a halohydrocarbon blowing agent, an aromatic polyisocyanate with a polyol prepared by a process which comprises reacting saccharose with formaldehyde and diethylene glycol by first adding the formaldehyde to said saccharose in a water solution and then combining the resulting product with diethylene glycol, said reaction being carried out in the presence of an acid catalyst and in such proportions that there is at least 0.5 mol of formaldehyde present for each monosaccharide unit of said saccharose, said acid catalyst being present in an amount less than about 0.005 percent by weight of the reaction mixture.

References Cited by the Examiner

UNITED STATES PATENTS

| | | | |
|---|---|---|---|
| 1,147,264 | 7/15 | Peter | 260—17.2 |
| 1,815,930 | 7/31 | Novotny et al. | 260—17.2 |
| 1,959,433 | 5/34 | Loetscher | 260—17.2 |
| 2,902,478 | 9/59 | Anderson | 260—209 |
| 2,990,379 | 6/61 | Young et al. | 260—2.5 |

OTHER REFERENCES

Wilson et al.: "Science," November 28, 1958, volume 128, No. 3335, page 1343.

LEON J. BERCOVITZ, *Primary Examiner.*

DANIEL ARNOLD, *Examiner.*